United States Patent
Fan

(10) Patent No.: US 7,656,557 B2
(45) Date of Patent: Feb. 2, 2010

(54) TOOLS TO EMBED TAMPERING INDICATOR INTO DIGITAL VISUAL WORKS USING TWO SCREENS WITH HALFTONING ELEMENTS OF DIFFERENT SIZE DOTS OR SHAPES

(75) Inventor: Zhigang Fan, Webster, NY (US)

(73) Assignee: XEROX Corporation, Norwalk, CT (US)

( * ) Notice: Subject to any disclaimer, the term of this patent is extended or adjusted under 35 U.S.C. 154(b) by 645 days.

(21) Appl. No.: 11/412,624

(22) Filed: Apr. 27, 2006

(65) Prior Publication Data
US 2007/0267864 A1 Nov. 22, 2007

(51) Int. Cl.
H04N 1/405 (2006.01)
B41M 3/14 (2006.01)

(52) U.S. Cl. ............ 358/3.06; 358/3.11; 358/3.2; 358/3.28

(58) Field of Classification Search ............ 358/1.9, 358/3.06, 3.09–3.13, 3.2, 3.28, 534–536, 358/450, 466; 382/100, 135, 137, 237, 270; 283/72, 113, 57, 58, 902; 399/180, 181, 399/366
See application file for complete search history.

(56) References Cited

U.S. PATENT DOCUMENTS

| 5,788,285 | A | 8/1998 | Wicker | |
|---|---|---|---|---|
| 6,069,636 | A | * 5/2000 | Sayuda et al. | 345/589 |
| 7,212,649 | B2 | * 5/2007 | Watanabe et al. | 382/100 |
| 2006/0262957 | A1 | * 11/2006 | Asano | 382/100 |
| 2009/0067006 | A1 | * 3/2009 | Kobayashi et al. | 358/3.06 |

FOREIGN PATENT DOCUMENTS

JP 01037581 A * 2/1989

\* cited by examiner

*Primary Examiner*—Scott A Rogers
(74) *Attorney, Agent, or Firm*—Miele Law Group P.C.

(57) ABSTRACT

In accordance with one embodiment, apparatus are provided, which include a digital continuous-tone two-dimensional authentic image and an image processor. Tamper message data is provided which represents a tamper message when viewed. Two halftoning screens are provided to be applied to at least a portion of the continuous-tone two-dimensional authentic image, to embed the tamper message data within a portion of the authentic image, in a manner so as to be substantially not visible in a printed or displayed version of the authentic image absent image processing or tampering of the authentic image. The screens include a first screen to apply first elements arranged in a first way, and a second screen to apply second elements arranged in a second way. A halftoner applies the two halftoning screens to visibly portray desired information of the continuous-tone authentic image. The first screen is applied in a limited area of the authentic image and in a form defined by the tamper message data. The second screen is applied in an area abutting the limited area.

12 Claims, 4 Drawing Sheets

TOOLS TO EMBED TAMPERING INDICATOR INTO DIGITAL VISUAL WORKS USING TWO SCREENS WITH HALFTONING ELEMENTS OF DIFFERENT SIZE DOTS OR SHAPES

FIELD OF THE DISCLOSURE

Aspects of the present disclosure relate to embedding information in printed works. Other aspects relate to revealing the tampering of printed documents.

BACKGROUND

Various known techniques exist for embedding information into a printed work, for example, a legal document or currency. The embedded information may be visual information, which can be embedded into the document by treating the document. For example, micro printing produces an image that is too small to be discerned by the naked eye. The size, for example, of the image may be one hundredth of a normal type size. While features of this size can be easily printed, they are difficult to copy or scan. The printed feature is thus covert, and may be viewed using a magnifying glass to confirm the fact that the printed item is an original.

Another technique that is used to authenticate documents is called the void pantograph. Printed dots of different sizes are utilized to create an effect. Smaller dots visible to the human eye dominate the appearance of the form. However the smaller dots are lost when a facsimile is produced in copying or scanning. Then, larger, less frequently printed dots become visible in the copy, and spell out the word "void".

SUMMARY

In accordance with one embodiment, apparatus are provided, which include a digital continuous-tone two-dimensional authentic image and an image processor. Tamper message data is provided which represents a tamper message when viewed. Two halftoning screens are provided to be applied to at least a portion of the continuous-tone two-dimensional authentic image, to embed the tamper message data within a portion of the authentic image, in a manner so as to be substantially not visible in a printed or displayed version of the authentic image absent image processing or tampering of the authentic image. The screens include a first screen to apply first elements arranged in a first way, and a second screen to apply second elements arranged in a second way. A halftoner applies the two halftoning screens to visibly portray desired information of the continuous-tone authentic image that is independent of the tamper message. The first screen is applied in a limited area of the authentic image and in a form defined by the tamper message data. The second screen is applied in an area abutting the limited area.

BRIEF DESCRIPTION OF THE DRAWINGS

Embodiments of the disclosure are further described in the detailed description, which follows, by reference to the noted drawings, in which like reference numerals represents similar parts throughout the several views of the drawings, and wherein.

DETAILED DESCRIPTION

In embodiments herein, a given two-dimensional image may, for example, be represented by a pattern (for example, an array) of pixels. Each pixel may correspond to a defined location in the image (for example, a grid cell), and includes tone information. In embodiments herein, for a given point (for example, corresponding to a pixel or a region of an image), tone information generally includes a color component (related to one or more frequencies of visible light) and an intensity component (related to a radiant intensity of a pixel). While an image may be represented by a pattern of pixels, it may, per some embodiments, (instead, or in addition) be represented by vector information, e.g., by points, lines, or triangles.

In a color image, by way of example, a given pixel may have tone information defined in terms of several color values—C for cyan, M for magenta, Y for yellow, and K for black. In simplified terms, the magnitude of each of these values may represent the intensity of the individual color at the pixel's location. In embodiments herein, each color component of an image may be referred to as a layer or a separation of the image. A color image may be a composite of the complete set of separations.

In embodiments herein a continuous-tone image, which may be a grey-level or color image, includes, for example, color values for respective pixels in a given sequence represented by a graduated magnitude value (e.g., a value from among 256 levels when the separation is represented by 8 bits per pixel). A halftoned image includes, for example, color values for respective pixels, or individual dots or halftoning elements in a given separation represented by a binary value.

A printed item, in embodiments herein, may refer to any item that has information printed thereon. An authenticated or original printed item, in embodiments here, may refer to a printed item that has not been copied without authorization and/or that carries certain information that only an original or authenticated item will have. In embodiments herein, an authenticated or original printed item may refer to such an item that either contains positive indicia that it is authentic or original, or lacks an indication that it is void, inauthentic, or not original. In addition, or in the alternative, a printed item that is neither authentic nor original may lack a certain appearance or quality when viewed by the naked eye, or when viewed using some other mechanism.

Figure 1:
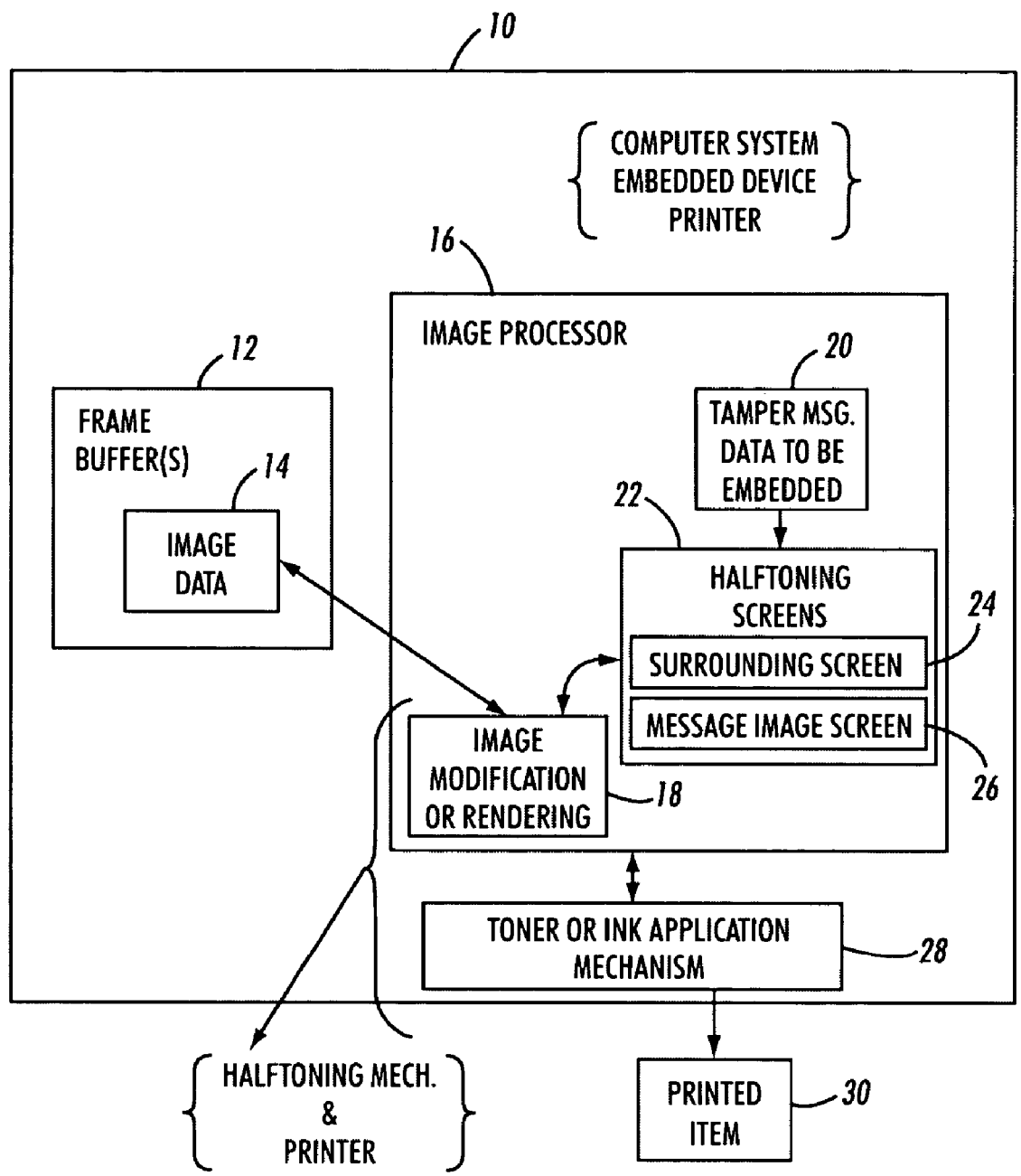
FIG. 1 is a block diagram of a system with an image processor.

FIG. 1 is a block diagram of a system 10 with an image processor 16. The illustrated system 10 includes one or more frame buffers 12, an image processor 16, and a toner or ink application mechanism 28. The illustrated one or more frame buffers 12 include, among other elements not specifically shown, image data 14. The illustrated image processor 16 includes an image modification or rendering mechanism 18, tamper message data 20 to be embedded within an image to be printed on the printed item, and halftoning screens 22.

The illustrated image modification or rendering mechanism 18 may do one or both of modifying and rendering image data 14 stored in frame buffer(s) 12. For example, mechanism 18 may modify the image data 14 by replacing frames in frame buffer(s) 12 with pixel information representing an image document using a particular format. Mechanism 18, when rendering the image data, may perform operations on the image data to put it a condition suitable for rendering. For example, the illustrated image modification or rendering mechanism 18 may comprise a halftoning mechanism for halftoning the image data to make it suitable for printing or for otherwise applying the image to a printed item. For example, certain printers require unique halftoning operations to be performed on the image data in order for those printers to apply various layers of ink to the printed item. In accordance with any halftoning that may be performed, toner or ink application mechanism 28 will apply toner or ink to the printed item, thereby placing the image on the printed item.

In the illustrated embodiment, the image data 14 includes a digital two-dimensional authentic image to be rendered on a printed item 30. The illustrated image processor 16 processes the image, making it suitable for printing on printed item 30. As the image is printed on the printed item 30, tamper message data 20 is embedded within the image in the printed item 30. The tamper message data 20 may include a textual message, a symbol, or a pattern, and may represent an inauthentic message, for example, that the resulting printed item (e.g., a printed document) is not authentic, not original, or void.

The halftoning screens 22 are applied to at least a portion of the two-dimensional image represented within image data 14, as it is modified or rendered by image modification or rendering mechanism 18.

In the illustrated embodiment, the halftoning screens 22 include a surrounding screen 24 and a message image screen 26. These screens cause tamper message data to be embedded within a portion of the continuous-tone authentic image, in a manner so as to be substantially not visible in a printed or displayed version of the authentic image absent image processing or tampering to the authentic image. Message image screen 26 applies a first halftoning operation applying halftoning elements of a first type. Surrounding screen 24 applies a second halftoning operation applying halftoning elements of a second type. The first halftoning operation is on a limited area of the authentic image in a form defined by the tamper message data 20. The second halftoning operation is applied in an area abutting the limited area. The second halftoning area may surround the limited area. The surrounding screen 24 may be applied to the entire remaining portion of the authentic image.

In one embodiment, the image modification or rendering mechanism 18 and the tone or ink application mechanism 28 collectively include a halftoning mechanism and a printer, which together form the image on printed item 30.

Figure 2:
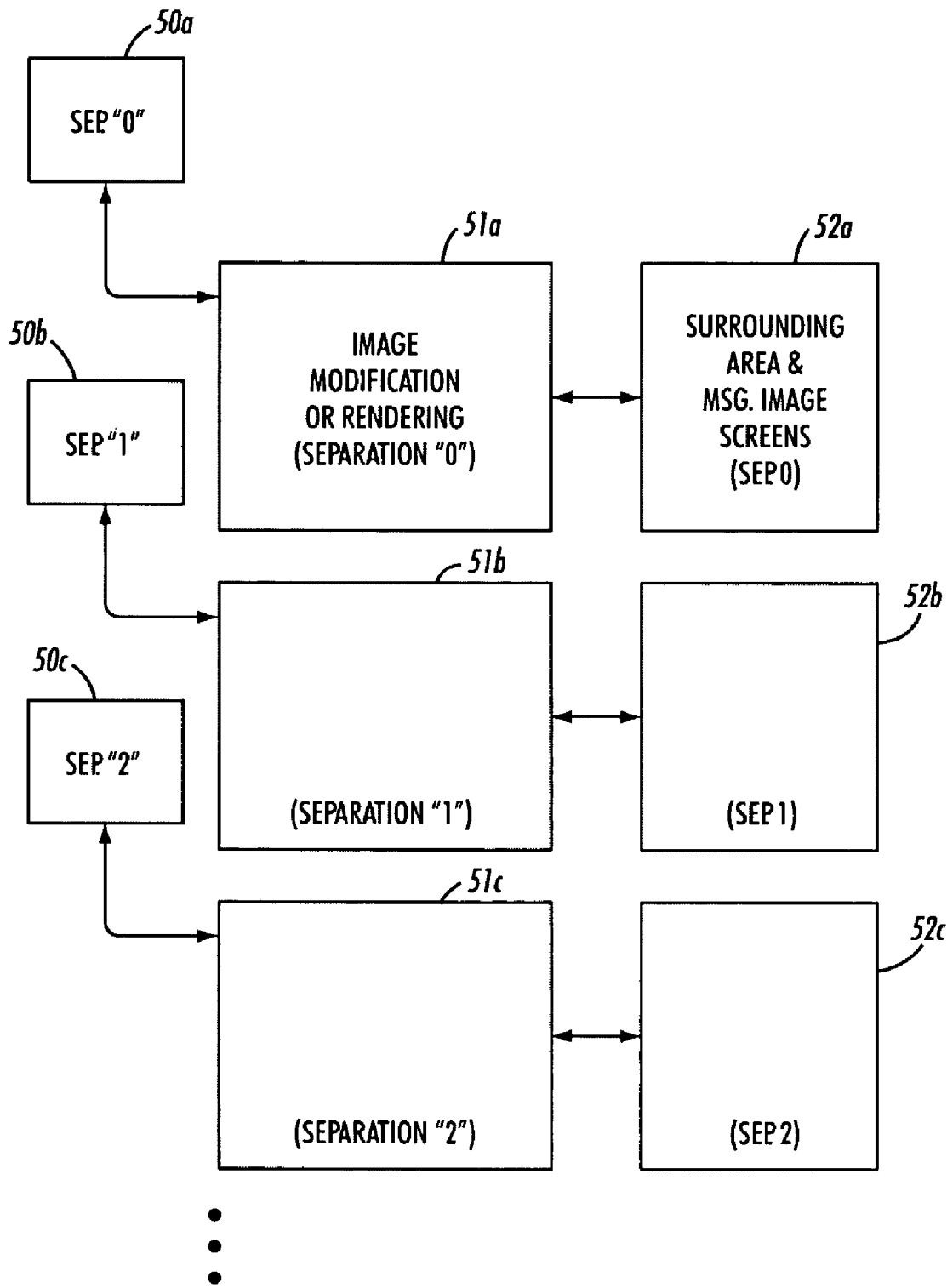
FIG. 2 is a block diagram schematically showing a multiple channel tamper indicator embedding subsystem.

FIG. 2 is a block diagram of a multiple channel tamper indicator embedding subsystem. Separate image modification or rendering mechanisms 51 and screens 52 are provided for each separation forming the composite image on printed item 30. For example, an authentication image may be formed within multiple separations. Those separations, in the example, may include, for example, magenta, cyan, yellow and black separations. Accordingly, a separation "0" 50a is modified or rendered by image modification or rendering mechanism 51a, which includes the application of surrounding area and message image screens 52a for that separation. Separations "1" 50b and "2" 50c are separately processed by image modification or rendering mechanisms 51b and 51c, respectively, in accordance with their respective surrounding area and message image screens 52b and 52c.

Figure 3:
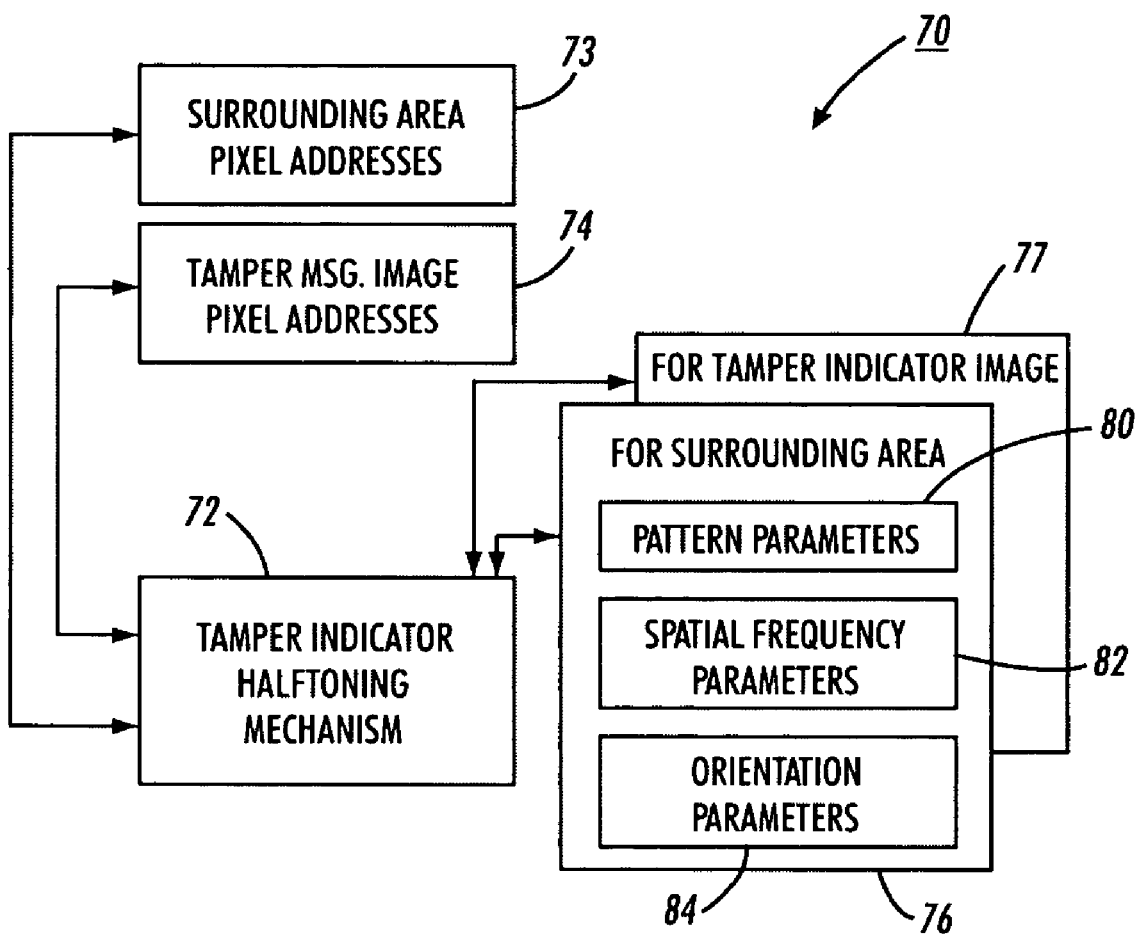
FIG. 3 is a block diagram of a tamper indication halftoning subsystem.

FIG. 3 illustrates, in a block diagram, an embodiment of a tamper indicator halftoning subsystem 70. System 10 of FIG. 1 may include a halftoning subsystem as shown in FIG. 3, for example, as part of its halftoning engine. The illustrated subsystem 70 includes a tamper indicator halftoning mechanism 72, which performs tamper message halftoning on portions of the image to cause embedding of tamper message data into the image portrayed on printed item 30. The tamper indictor halftoning mechanism 72 may be provided as part of or separate from a halftoning engine of the image processor 16 of system 10. Tamper indicator halftoning mechanism 72 applies a certain halftoning operation on a limited area corresponding to the tamper message image pixel addresses 74, and applies another halftoning operation on a surrounding pixel area surrounding the limited area, the surrounding pixel area corresponding to surrounding pixel addresses 73. These halftoning operations may be performed by a surrounding halftoning engine 76 and a tamper indicator halftoning engine 77.

Each of those engines 76, 77 may include a mechanism for controlling pattern parameters 80, spatial frequency parameters 82, and/or orientation parameters 84 each affecting the halftoning elements used to modulate the image for the tamper indictor image portion and for the surrounding image portion.

The illustrated tamper indicator image halftoning engine 77 performs a first halftoning operation applying first elements arranged in a first way. The illustrated surrounding image halftone engine 76 performs a second halftoning operation applying second elements arranged in a second way. The first elements may include halftoning elements of a first shape applied using a first halftone threshold matrix, and the second elements may include halftoning elements of a second shape applied using a second halftone threshold matrix. The first shape may be the same as the second shape. By way of example, the first and/or second shape can be in the shape of a dot or another shape, for example, an elliptical dot. The first and second elements may each include different size dots or shapes.

The second halftone threshold matrix, in the illustrated embodiment, is a mirror of the first halftone threshold matrix about a given axis in the plane of the image.

The following are examples of a first halftone matrix for application to the tamper message image pixel addresses and of a second halftone matrix for application to the surrounding area pixel addresses. Each of these matrices is a 1×29 matrix.

In this one example embodiment, the first halftone matrix is as follows: 36, 12, 220, 180, 84, 132, 164, 196, 116, 20, 4, 12, 108, 188, 156, 124, 76, 172, 228, 212, 148, 52, 36, 68, 100, 92, 60, 28, 44, with a shift parameter of S1=12.

In this one example embodiment, the second halftone matrix is as follows, which is a "mirror" of the first halftone matrix: 44, 28, 60, 92, 100, 68, 36, 52, 148, 212, 228, 172, 76, 124, 156, 188, 108, 12, 4, 20, 116, 196, 164, 132, 84, 180, 220, 12, 36, with a shift parameter of S2=17.

In this example, where these example halftone matrices are applied, the first 1×29 halftone matrix is applied to each of the numbers in the matrix as a respective threshold value to be applied to a respective pixel. For example, suppose the first row of an image has pixels, from left to right, p1, p2, p3 ... p1 12, p1 13, corresponding to a surrounding area surrounding a tamper message image, while, in the same row, following pixels p1 14, p1 15, p1 16, ... are pixels corresponding to a tamper message image. For this row, the halftone matrix value 36 will be the threshold applied to pixel p1. Accordingly, if the pixel p1 has a value that is equal to or above 36, a dot will be applied for that pixel in the output image, while if p1 is below 36, a dot will not be applied at that pixel in the output image. Similarly, for pixel p2, if the value of pixel p2 is equal to or above 12, a dot will be applied for that pixel in the output image, while if the value of p2 is below 12, a dot will not be applied for that pixel in the output image. Each of the threshold values in the halftone matrices is applied for respective pixels along the row in this manner. Twenty-nine numbers of the 1×29 first halftone matrix are repeated for additional pixels once all twenty-nine values have been used in the matrix. Accordingly, at the 30$^{th}$ pixel p30, in that same first row, the threshold value 36 (of the first halftone matrix) is applied, at the 31$^{st}$ pixel p31, the threshold value 12 is applied, and so on.

For the 113$^{th}$ pixel, the threshold is 92 (the 26$^{th}$ value in the first halftone matrix). Once the 114$^{th}$ pixel is reached at p114, the second "mirror" halftone matrix will be applied for each of the pixels. Accordingly, for pixel value p114, if the pixel value p114 is equal to or above 220 (the 27$^{th}$ value in the second halftone matrix), a dot will be applied for that pixel in the output image, while if the pixel value p114 is less than 220, a dot will not be applied for that pixel in the output image.

For the second row of image, the first halftone matrix is shifted by S1=12, and the second halftone matrix is shifted by S2=17. Specifically, the first and second matrix will start with the 13$^{th}$ value and the 18$^{th}$ value, respectively. The matrices further shift for each increment of row.

This example assumes that the first and second halftone matrices are being applied to a gray-tone continuous-tone image, to output a binary image.

In this example, the given axis (about which the second halftone threshold matrix is a mirror of the first halftone threshold matrix) is a vertical axis.

Pattern parameters 80 may be provided to specify the types of halftoning elements and other parameters concerning those halftoning elements. For example, a set of pattern parameters may include the dimensions and shape of each halftoning element. The spatial frequency of the halftoning elements may be specified by spatial frequency parameters 82, SO that the spatial frequency of the elements for the tamper message image pixel addresses 74 is different than the spatial frequency of the elements for the surrounding pixel addresses 73. In addition, orientation parameters 84 may be provided to specify the orientation (for example, the angle) of the halftoning elements for the surrounding pixel addresses 73 which may be different than the orientation for the tamper message image pixel addresses 74.

Figure 4:
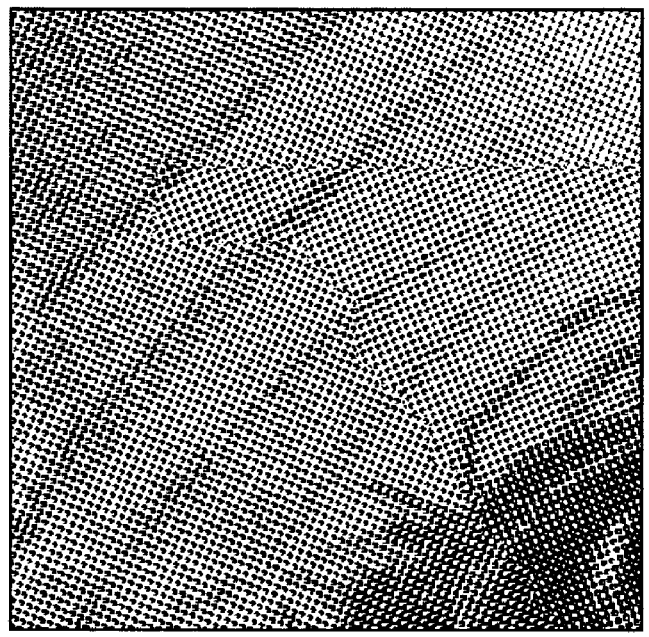
FIG. 4 is a diagram of an original image containing tamper indicating information with reduced visibility or perceivability.
Figure 5:
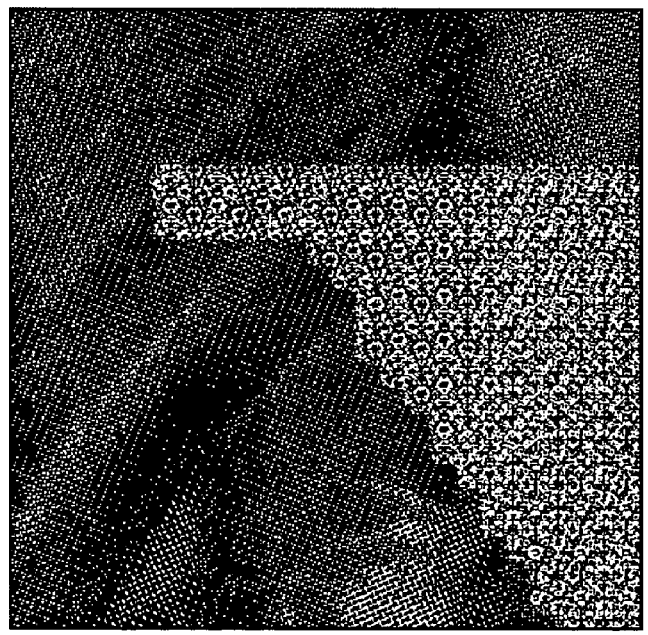
FIG. 5. is a diagram of the image after being processed, for example, reproduced or scanned.

FIG. 4 illustrates an example of an original image, in which the tamper message image is difficult to see or discern by the viewer. FIG. 5 is a processed or tampered version of the image shown in FIG. 4, thereby making the tamper message image clearly viewable.

Each element described herein above may be implemented with a hardware processor together with computer memory executing software, or with specialized hardware for carrying out the same functionality. Any data handled in such processing or created as a result of such processing can be stored in any type of memory available to the artisan and appropriate for such data. Media may comprise any form of data storage mechanism, including different memory technologies as well as hardware or circuit representations of such structures and of such data.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. Apparatus comprising:
   a media-encoded continuous-tone two-dimensional authentic image;
   an image processor;
   media-encoded tamper message data representing a tamper message image;
   two screens to be applied to at least a portion of the two-dimensional image to embed the tamper message data within a portion of the authentic image, in a manner so as to be substantially not visible in a printed or displayed version of the authentic image absent image processing or tampering to the authentic image, the screens including a first screen applying first elements arranged in a first way and including a second screen applying second elements arranged in a second way;
   a halftoner to apply each of the first screen and the second screen to visibly portray, in the printed or displayed halftoned version of the authentic image, desired continuous-tone information of the authentic image; and
   the first screen being applied in a limited area of the authentic image and in a form defined by the tamper message data, and the second screen being applied in an area abutting the limited area;
   wherein the first elements include halftoning elements of a first shape applied using a first halftone threshold matrix and wherein the second elements include halftoning elements of a second shape applied using a second halftone threshold matrix;
   wherein the tamper message data includes one or more of a textual message, a symbol, and a pattern;
   wherein the first shape is the same or different than the second shape;
   wherein the first and second elements each include different size dots or shapes.

2. Apparatus comprising:
   a media-encoded continuous-tone two-dimensional authentic image;
   an image processor;
   media-encoded tamper message data representing a tamper message image;
   two screens to be applied to at least a portion of the two-dimensional image to embed the tamper message data within a portion of the authentic image, in a manner so as to be substantially not visible in a printed or displayed version of the authentic image absent image processing or tampering to the authentic image, the screens including a first screen applying first elements arranged in a first way and including a second screen applying second elements arranged in a second way;
   a halftoner to apply each of the first screen and the second screen to visibly portray, in the printed or displayed halftoned version of the authentic image, desired continuous-tone information of the authentic image; and
   the first screen being applied in a limited area of the authentic image and in a form defined by the tamper message data, and the second screen being applied in an area abutting the limited area;
   wherein the first elements include halftoning elements of a first shape applied using a first halftone threshold matrix and wherein the second elements include halftoning elements of a second shape applied using a second halftone threshold matrix;
   wherein the tamper message data includes one or more of a textual message, a symbol, and a pattern;
   wherein the first shape is the same or different than the second shape; and
   wherein the second halftone threshold matrix is a mirror of the first halftone threshold matrix about a given axis in the plane of the image.

3. The apparatus according to claim 2, wherein the given axis is vertical or horizontal.

4. A method comprising:
- providing a media-encoded continuous-tone two-dimensional authentic image;
- performing image processing on the two-dimensional authentic image with an image processor;
- providing media-encoded tamper message data representing a tamper message image;
- applying two screens to at least a portion of the two-dimensional image to embed the tamper message data within a portion of the authentic image, in a manner so as to be substantially not visible in a printed or displayed version of the authentic image absent image processing or tampering to the authentic image, the screens including a first screen applying first elements arranged in a first way and including a second screen applying second elements arranged in a second way;
- using a halftoner to apply each of the first screen and the second screen to visibly portray, in the printed or displayed halftoned version of the authentic image, desired continuous-tone information of the authentic image; and
- the first screen being applied in a limited area of the authentic image and in a form defined by the tamper message data, and the second screen being applied in an area abutting the limited area;
- wherein the first elements include halftoning elements of a first shape applied using a first halftone threshold matrix and wherein the second elements include halftoning elements of a second shape applied using a second halftone threshold matrix;
- wherein the tamper message data includes one or more of a textual message, a symbol, and a pattern;
- wherein the first shape is the same or different than the second shape;
- wherein the first and second elements each include different size dots or shapes.

5. The method according to claim 4, wherein the first elements include halftoning elements of a first shape applied using a first halftone threshold matrix and wherein the second elements include halftoning elements of a second shape applied using a second halftone threshold matrix.

6. The method according to claim 5, wherein the tamper message data includes one or more of a textual message, a symbol, and a pattern.

7. The method according to claim 6, wherein the first shape is the same as the second shape.

8. The method according to claim 7, wherein the first and second elements each include different size dots or shapes.

9. A method comprising:
- providing a media-encoded continuous-tone two-dimensional authentic image;
- performing image processing on the two-dimensional authentic image with an image processor;
- providing media-encoded tamper message data representing a tamper message image;
- applying two screens to at least a portion of the two-dimensional image to embed the tamper message data within a portion of the authentic image, in a manner so as to be substantially not visible in a printed or displayed version of the authentic image absent image processing or tampering to the authentic image, the screens including a first screen applying first elements arranged in a first way and including a second screen applying second elements arranged in a second way;
- using a halftoner to apply each of the first screen and the second screen to visibly portray, in the printed or displayed halftoned version of the authentic image, desired continuous-tone information of the authentic image; and
- the first screen being applied in a limited area of the authentic image and in a form defined by the tamper message data, and the second screen being applied in an area abutting the limited area;
- wherein the first elements include halftoning elements of a first shape applied using a first halftone threshold matrix and wherein the second elements include halftoning elements of a second shape applied using a second halftone threshold matrix;
- wherein the tamper message data includes one or more of a textual message, a symbol, and a pattern;
- wherein the first shape is the same as the second shape;
- wherein the second halftone threshold matrix is a mirror of the first halftone threshold matrix about a given axis in the plane of the image.

10. The method according to claim 9, wherein the given axis is vertical or horizontal.

11. Machine-readable media encoded with data, the encoded data interoperable with a machine to cause:
- providing a media-encoded continuous-tone two-dimensional authentic image;
- performing image processing on the two-dimensional authentic image with an image processor;
- providing media-encoded tamper message data representing a tamper message image;
- applying two screens to at least a portion of the two-dimensional image to embed the tamper message data within a portion of the authentic image, in a manner so as to be substantially not visible in a printed or displayed version of the authentic image absent image processing or tampering to the authentic image, the screens including a first screen applying first elements arranged in a first way and including a second screen applying second elements arranged in a second way;
- performing halftoning to apply each of the first screen and the second screen to visibly portray, in the printed or displayed halftoned version of the authentic image, desired continuous-tone information of the authentic image; and
- the first screen being applied in a limited area of the authentic image and in a form defined by the tamper message data, and the second screen being applied in an area abutting the limited area;
- wherein the first elements include halftoning elements of a first shape applied using a first halftone threshold matrix and wherein the second elements include halftoning elements of a second shape applied using a second halftone threshold matrix;
- wherein the tamper message data includes one or more of a textual message, a symbol, and a pattern;
- wherein the first shape is the same or different than the second shape; and
- wherein the first and second elements each include different size dots or shapes.

12. The machine-readable media according to claim 11, wherein the encoded data is interoperable with a machine to cause the first elements to include halftoning elements of a first shape applied using a first halftone threshold matrix and the second elements to include halftoning elements of a second shape applied using a second halftone threshold matrix.

* * * * *